United States Patent [19]

Inoue et al.

[11] Patent Number: 5,063,902
[45] Date of Patent: Nov. 12, 1991

[54] IGNITION TIMING CONTROLLING APPARATUS FOR INTERNAL COMBUSTION ENGINE

[75] Inventors: Noriyuki Inoue; Satoru Ohkubo, both of Amagasaki; Toshio Iwata; Akira Demizu, both of Himeji, all of Japan

[73] Assignee: Mitsubishi Denki Kabushiki Kaisha, Tokyo, Japan

[21] Appl. No.: 493,670

[22] Filed: Mar. 15, 1990

[30] Foreign Application Priority Data

Mar. 15, 1989 [JP] Japan .................................. 1-65219
Mar. 15, 1989 [JP] Japan .................................. 1-65221
Mar. 15, 1989 [JP] Japan .................................. 1-65222

[51] Int. Cl.$^5$ .............................................. F02P 5/145
[52] U.S. Cl. .................................................... 123/425
[58] Field of Search ................................ 123/425, 435

[56] References Cited

U.S. PATENT DOCUMENTS 3,875,912  4/1975  Bullo .................................... 123/425
4,130,097  12/1978 Ford .................................... 123/425
4,314,534  2/1982  Nakajima et al. ..................... 123/435
4,466,408  8/1984  Cheklich .............................. 123/425
4,531,399  7/1985  Aono ...................................... 73/4 R Primary Examiner—Andrew M. Dolinar
Attorney, Agent, or Firm—Sughrue, Mion, Zinn, Macpeak and Seas

[57] ABSTRACT

An ignition timing controlling apparatus which calculates a crank angle when the pressure building-up rate in a cylinder of an internal combustion engine is the maximum, and feedback-controls an ignition timing so as to make the deviation value between the crank angle and the target value thereof be zero. The apparatus does not feedback-control in the predetermined running region where the crank angle at which pressure building-up rate in the cylinder at the time of light loading, idling and so on is the maximum is unstabilized, and ignites a plug at a basic ignition timing determined by running state of the engine as well as makes the gain of feedback-control differ from each other according to whether the deviation is in the advanced angle side or delayed angle side, and is capable of controlling ignition timing so that the maximum torque can be obtained regardless of elapsing change and dispersion in manufacturing.

11 Claims, 12 Drawing Sheets

IGNITION TIMING CONTROLLING APPARATUS FOR INTERNAL COMBUSTION ENGINE

BACKGROUND OF THE INVENTION

1. Field of the Invention

The present invention relates to an ignition timing controlling apparatus of an internal combustion engine, especially to an ignition timing controlling apparatus which controls ignition timing of the internal combustion engine so as to be at the time when the maximum torque of the internal combustion engine is obtained.

2. Description of Related Art

As the conventional ignition timing controlling apparatus of an internal combustion engine, there are ones which are disclosed in Japanese Patent Application Laid-Open No. 57-59060 and in Japanese Patent Application Laid-Open No. 57-b 59061. FIG. 1 is a longitudinal sectional view showing a construction of major parts of the engine. In the figure, reference numeral 1 is an air cleaner for cleaning air taken into the engine. The air having passed through aforesaid air cleaner 1 passes through an air flow meter 2 for measuring the air intake quantity, a throttle valve 3, and an intake manifold 4 in this order, and is supplied to a cylinder 5 of the engine. The cylinder 5 is surrounded by a water jacket for cooling. At the water jacket, a water temperature sensor 6 for detecting cool water temperature is provided. At the head of the cylinder 5 is an ignition plug 11. At the upper side portion of the engine, there is provided a distributor 8 which synchronizes with the rotation of the engine and distributes high voltage to the ignition plug 11. At the distributor 8, there is provided a crank angle sensor 7 for detecting a rotational angle (crank angle) of the engine.

The crank angle sensor 7 outputs a reference position pulse, for example, at every reference position of the crank angle (every 180° for four-cylinder engine, every 120° for six-cylinder engine) and outputs a unit pulse at every unit angle (for example every 1°). And in an ignition control device 12 to be described later, by calculating the number of unit pulses after the reference pulse is inputted, the crank angle at that time can be obtained. In addition, the number of revolutions of the engine can also be obtained by measuring the frequency or cycle of the unit angle pulse.

An air intake quantity signal S1 outputted from the air flow meter 2 indicating load of the engine, a water temperature signal S2 outputted from the water temperature sensor 6, and a crank angle signal S3 outputted from the crank angle sensor 7 are given to the ignition control device 12. The ignition control device 12 employs a microcomputer comprising, for example, CPU, RAM, ROM, input/output interface and so on. The ignition control device 12 carries out operations corresponding to each of the given signals to calculate the ignition timing, and outputs an ignition signal S7 to an ignition unit 13 so that the ignition plug 11 is ignited at the ignition timing thereof. The outputted ignition signal S7 is distributed by the distributor 8 to ignite the ignition plug 11 of the cylinder to be ignited.

The aforesaid calculation is for obtaining the ignition timing by previously storing basic ignition timing $\theta_o$ corresponding to the number of revolutions N of the engine and air intake quantity Q as a map, reading out the map value corresponding to the number of revolutions N of the engine and the air intake quantity Q at that time, and further by adding or multiplying compensation quantities due to water temperature, etc.

FIG. 2 is a graph explaining the contents of the map for obtaining the basic ignition timing $\theta_o$, and axes X,Y, and Z respectively show the number of revolutions N, air intake quantity Q, and the basic ignition timing $\theta_o$. The basic ignition timing $\theta_o$ is predetermined with the number of revolutions N and air intake quantity Q being as parameters so that the pressure building-up rate in the cylinder is the maximum when the output torque of the engine is the maximum.

As the conventional ignition timing controlling apparatus is constructed as above, there is a problem that the ignition timing cannot be controlled so as to be at the time when the maximum torque is obtained, in the case where MBT point (Minimum Advance for Best Torque) at the time of map setting of the ignition timing is different from MBT point at the time of actual usage of the engine due to elapsing change of the engine characteristic and dispersion in manufacturing, etc.

SUMMARY OF THE INVENTION

This invention has been devised to solve the aforedescribed conventional problem. The primary object of the invention is to provide an ignition timing controlling apparatus which is always capable of controlling the ignition timing when the maximum torque is obtained regardless of elapsing change and dispersion in manufacturing by calculating a rotational angle at which pressure building-up rate in the cylinder is the maximum and by controlling the ignition timing so that the calculated rotational angle coincides with the target value thereof.

Another object of the invention is to provide an ignition timing controlling apparatus which is capable of carrying out stabilized ignition timing controlling by judging the running state of the internal combustion engine, by stopping aforesaid controlling since the value of rotational angle at which the pressure building-up rate in the cylinder is the maximum varies under the specific running state such as idling and light loading, and by igniting at the target ignition timing predetermined according to the running state of the engine.

Further object of the invention is to provide an ignition timing controlling apparatus which is capable of keeping controlling characteristic almost constant regardless of advanced angle side or delayed angle side by judging, according to the sign of aforesaid deviation, the rotational angle at which the pressure building-up rate is the maximum exists whether in the advanced angle side or in delayed angle side, and by changing gain of controlling according to the judged result.

The above and further objects and features of the invention will more fully be apparent from the following detailed description with accompanying drawings.

DESCRIPTION OF THE PREFERRED EMBODIMENTS

Figure 1:
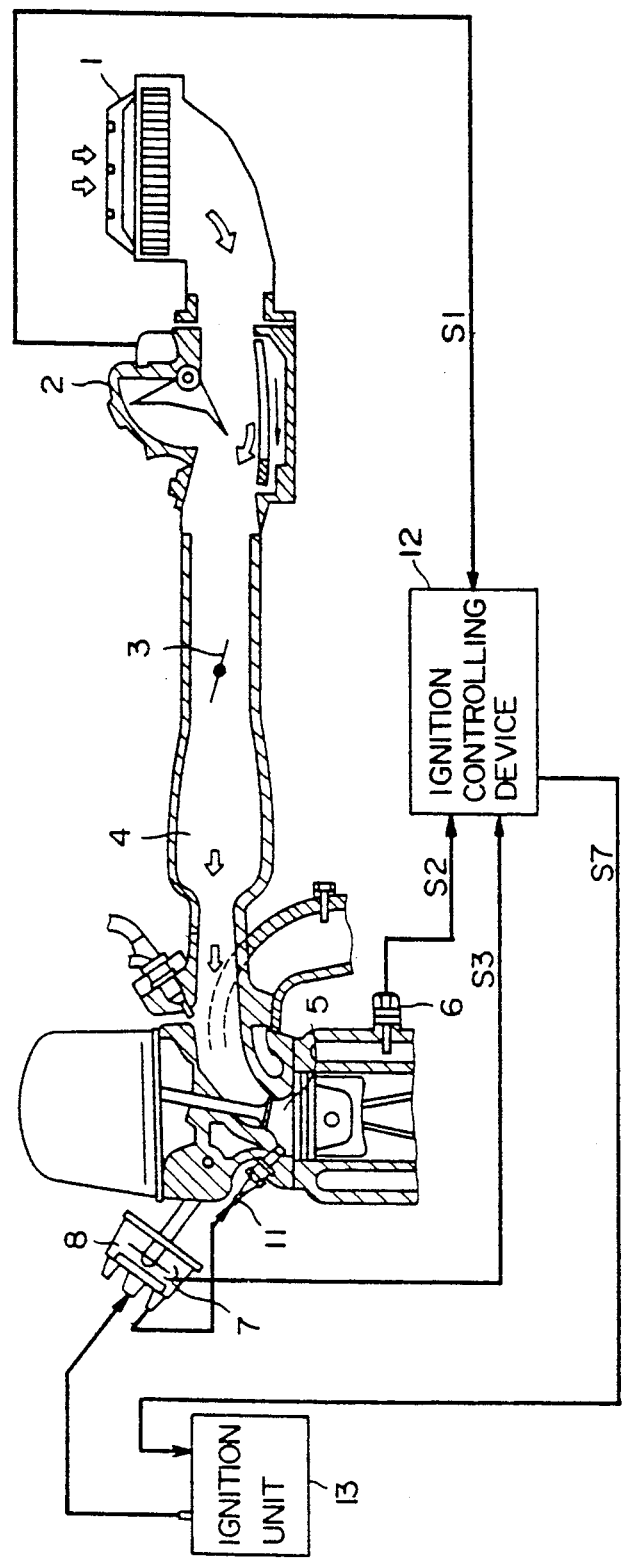
FIG. 1 is a longitudinal sectional view showing a construction of major parts of the conventional engine.
Figure 2:
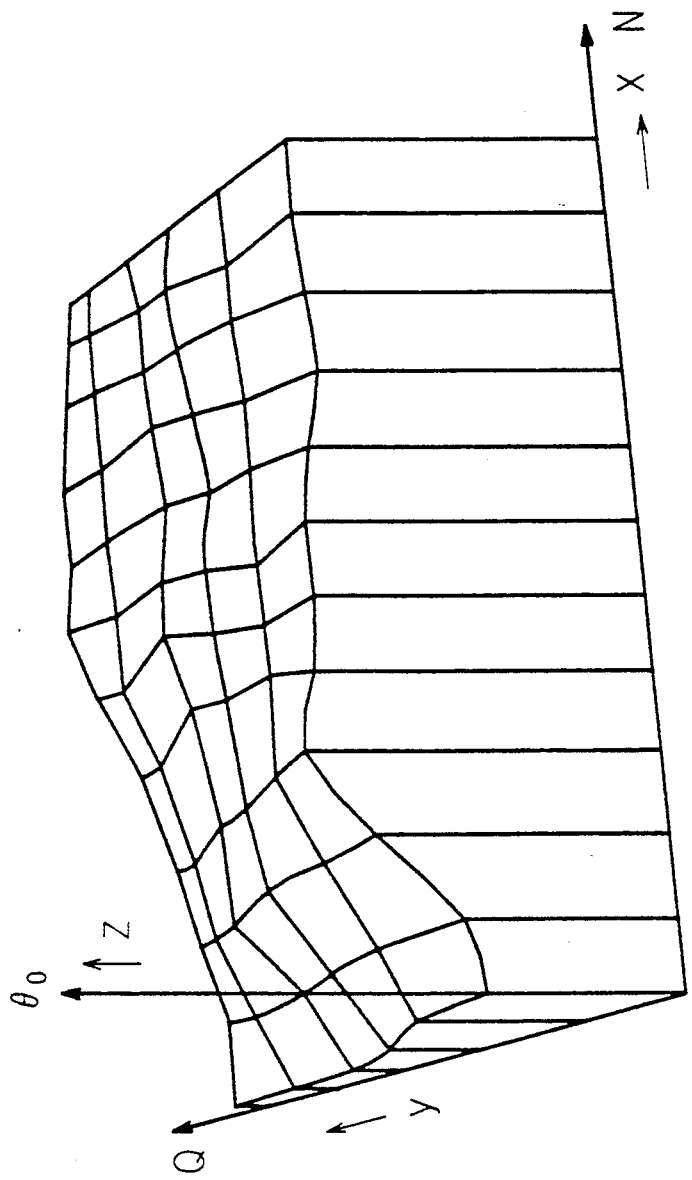
FIG. 2 is a drawing explaining contents of the map for obtaining basic ignition timing.
Figure 3:
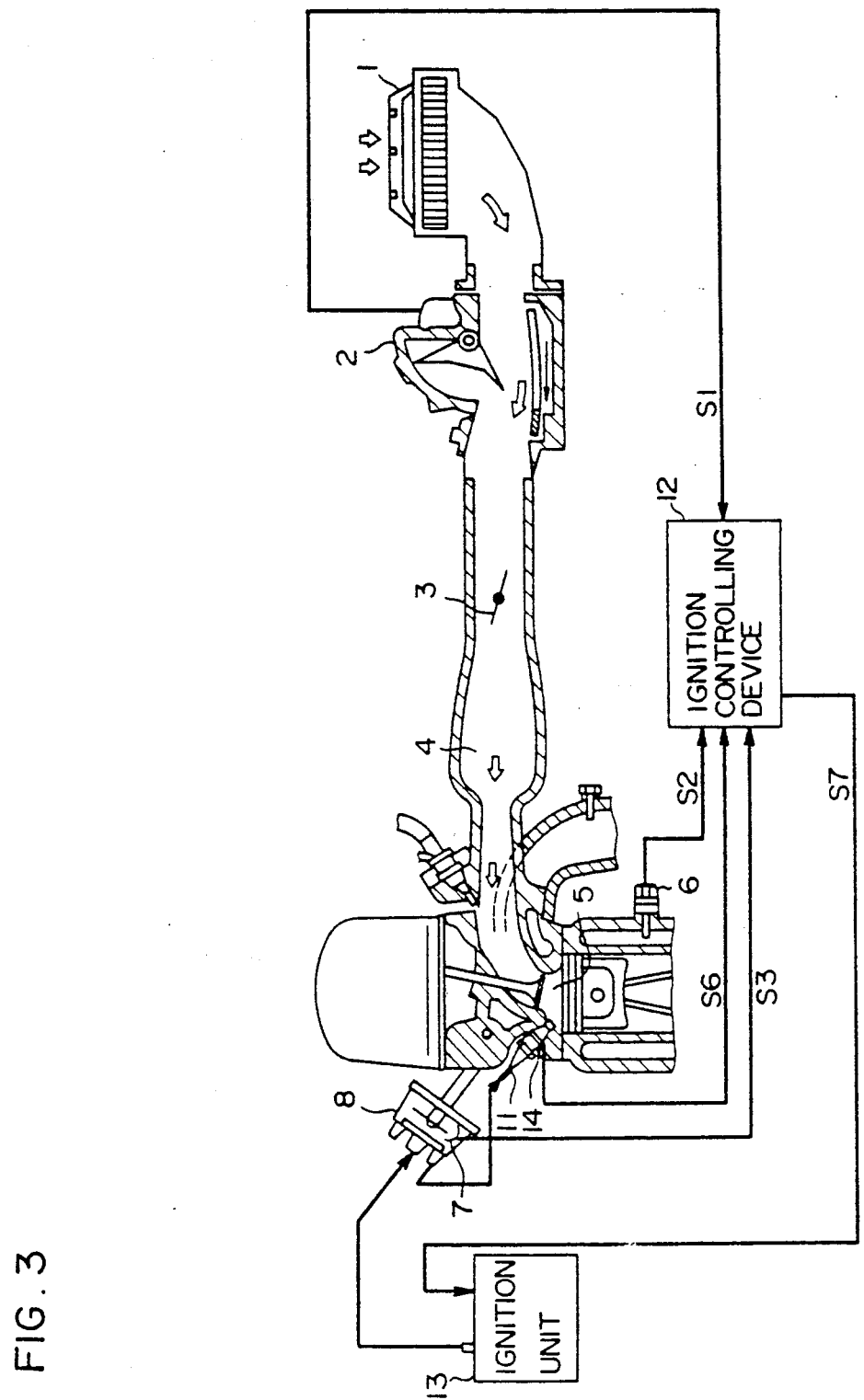
FIG. 3 is a longitudinal sectional view showing a construction of major parts of an internal combustion engine employing ignition timing controlling apparatus related to the invention.

FIG. 3 is a longitudinal sectional view showing a construction of major parts of an internal combustion engine employing ignition timing controlling apparatus related to the present invention. In the figure, reference numeral 1 is an air cleaner for cleaning air taken into the engine. The air having passed through aforesaid air cleaner 1 passes through an air flow meter 2 for measuring the air intake quantity, a throttle valve 3, and an intake manifold 4 in this order, and is supplied to a cylinder 5 of the engine. The cylinder 5 is surrounded by a water jacket for cooling. At the water jacket, a water temperature sensor 6 for detecting cool water temperature is provided. At the head of the cylinder 5 is an ignition plug 11. At the washer sealing the ignition plug 11, a pressure sensor 14 is provided. The pressure sensor 14 converts pressure in the cylinder into an electronic signal. At the upper side portion of the engine, there is provided a distributor 8 which synchronizes with the rotation of the engine and distributes high voltage to the ignition plug 11. At the distributor 8, there is provided a crank angle sensor 7 for detecting a rotational angle (crank angle) of the engine.

An air intake quantity signal S1 outputted from the air flow meter 2 indicating load of the engine, a water temperature signal S2 outputted from the water temperature sensor 6, a crank angle signal S3 outputted from the crank angle sensor 7, and a pressure signal S6 outputted from the pressure sensor 14 are given to an ignition control device 12, wherein operations corresponding to these signals are carried out to calculate the ignition timing, then an ignition signal S7 being outputted to an ignition unit 13 so that the ignition plug 11 is ignited at the ignition timing. The distributor 8 distributes the ignition signal 7 to ignite the ignition plug 11.

Figure 4:
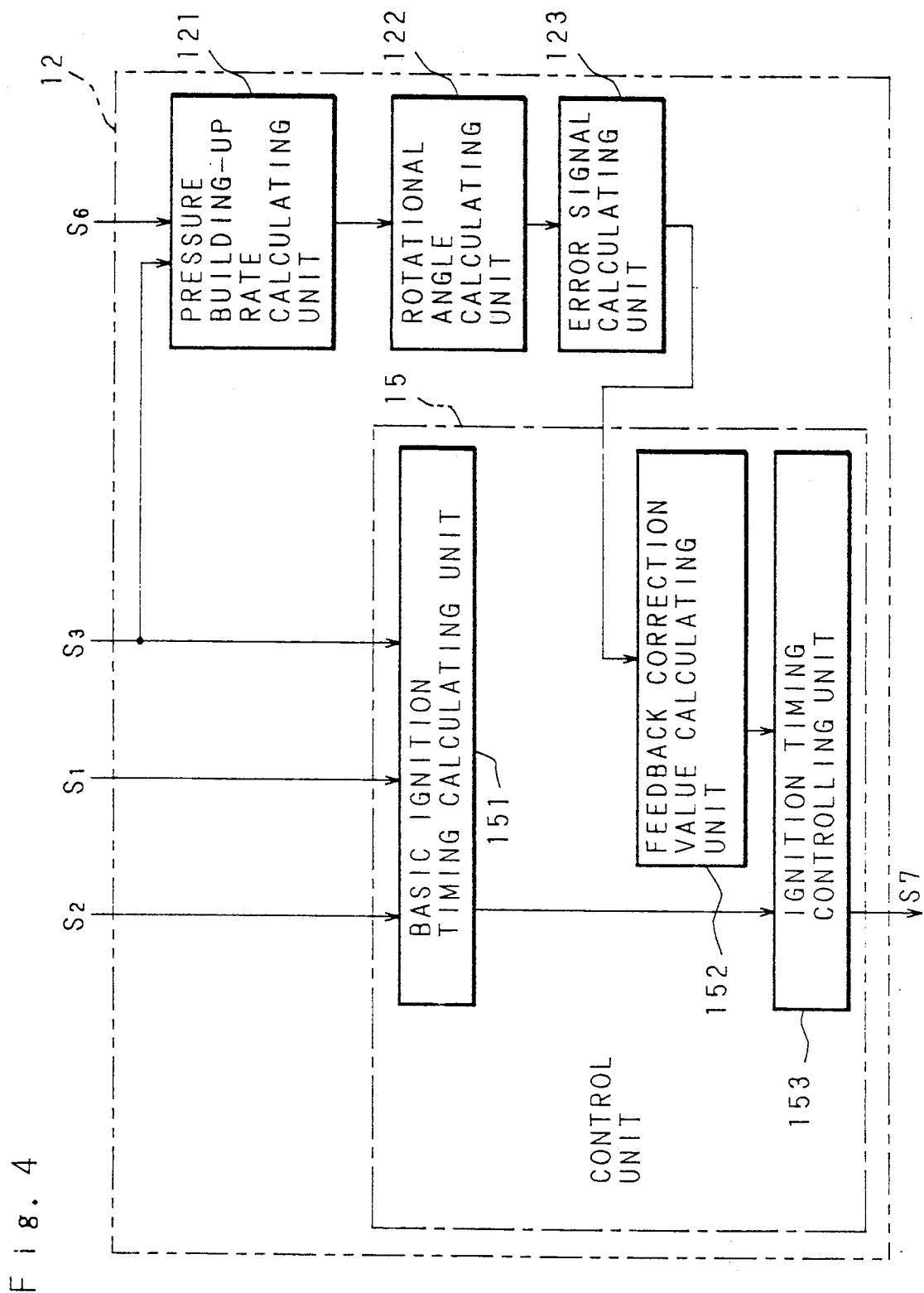
FIG. 4 is a block diagram showing a construction of an ignition control device.

FIG. 4 is a block diagram showing a construction of the ignition control device 12. The air intake quantity signal S1, water temperature signal S2 and crank angle signal S3 which have been given to the ignition control device 12 are given to a basic ignition timing calculating unit 151 which makes the signals S1 and S3 be parameters, calculates a mapped basic ignition timing $\theta_o$ and compensates it according to the water temperature signal S2.

In addition, the crank angle signal S3 is also given to a pressure building-up rate calculating unit 121 together with the pressure signal S6 from the pressure sensor 14. The pressure building-up rate calculating unit 121 obtains a difference of pressure detected at every one degree of crank angle to calculate the pressure building-up rate. The calculated result and the crank angle signal S3 at that time are given to a rotational angle calculating unit 122. The rotational angle calculating unit 122 calculates the crank angle $\theta$ (dP/d$\theta$) max at which the pressure building-up rate is the maximum. The calculated crank angle $\theta$ (dP/d$\theta$) max is given to an error signal calculating unit 123. The error signal calculating unit 123 calculates an error signal $\theta_e$ being the deviation between the target value $\theta_r$ and the crank angle $\theta$ (dP/d$\theta$) max. The calculated signal $\theta_e$ is given to a feedback correction value calculating unit 152. The feedback correction value calculating unit 152 calculates, corresponding to the error signal $\theta_e$, feedback correction value $\theta_{fb}$ which makes the deviation be zero. The calculated feedback correction value $\theta_{fb}$ is given to an ignition timing controlling unit 153 together with the basic ignition timing $\theta_o$ obtained at the basic ignition timing calculating unit 151, then the last ignition timing $\theta_{ig}$ is calculated. After that, an ignition signal S7 is outputted to the ignition unit 13 so that the ignition plug 11 is ignited at the ignition timing $\theta_{ig}$. The control unit 15 is comprised of the abovementioned basic ignition timing calculating unit 151, feedback correction value calculating unit 152, and ignition timing controlling unit 153.

Figure 5A:
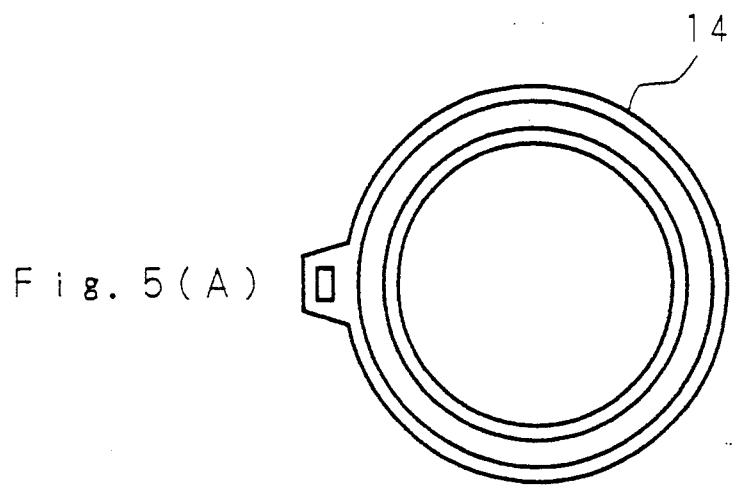
FIGS. 5(A) and 5(B) show an example of a configuration of a pressure sensor.
Figure 5B:
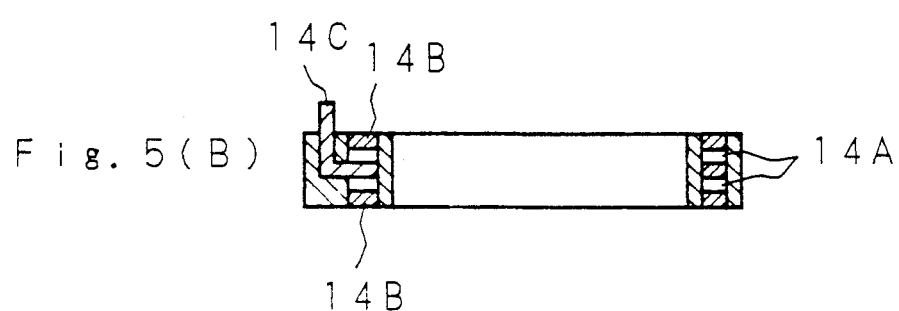
Figure 6:
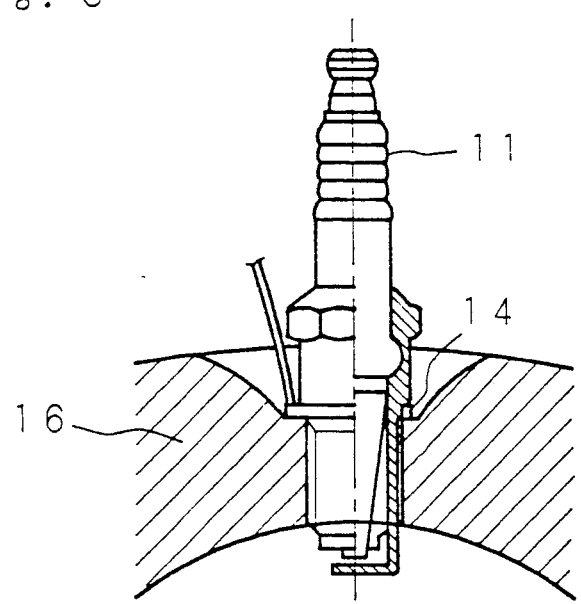
FIG. 6 is a sectional view showing the state of the pressure sensor being installed.

FIG. 5 is a drawing showing one example of a construction of the pressure sensor 14. FIG. 5(a) is a plan view and FIG. 5(b) is a sectional view thereof respectively. In the figures, reference numeral 14A designates two annular piezoelectric elements for converting the pressure into an electric signal, a plus electrode 14C being interposed therebetween. At the upper and lower sides of the piezoelectric elements, two annular minus electrodes 14B abut respectively. FIG. 6 is a sectional view showing the state of the pressure sensor 14 being installed. The pressure sensor 14 is jointed and installed by the ignition plug 11 at the cylinder head 16.

Next, explanation is given on relation among the crank angle at which the pressure building-up rate in the cylinder is the maximum, the output torque of the engine, and the ignition timing, which is the substance of the invention.

Figure 7:
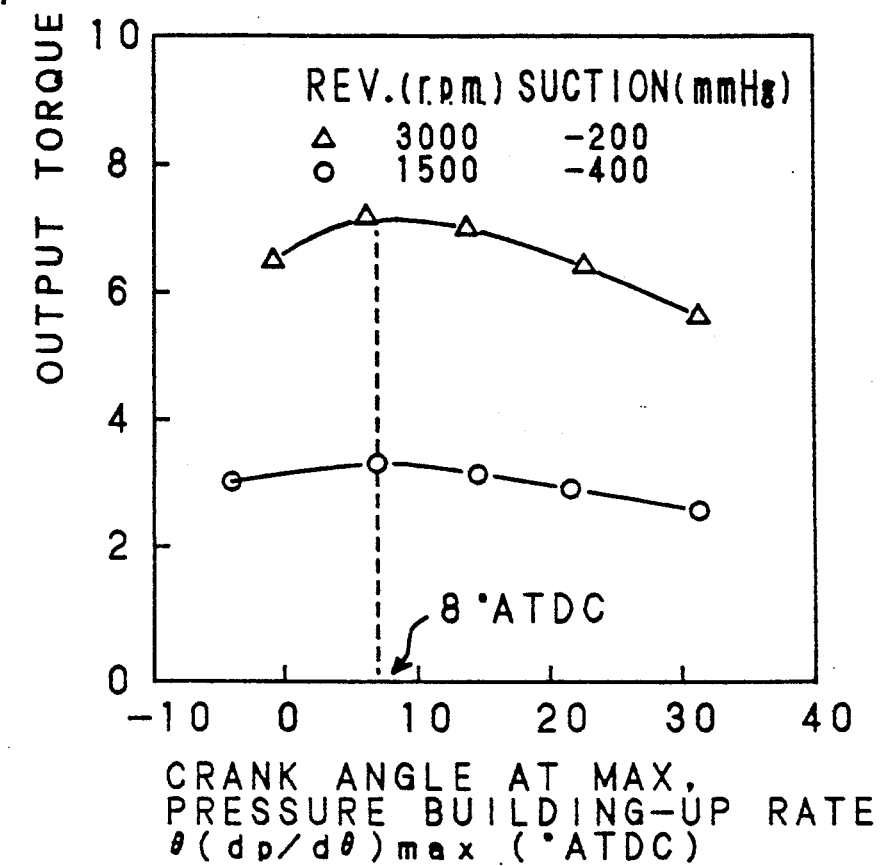
FIG. 7 is a graph showing a relation between the crank angle at which the pressure building-up rate becomes the maximum and output torque.

FIG. 7 shows relation between the crank angle $\theta$ (dP/d$\theta$) max at which the pressure building-up rate in the cylinder per one degree of the crank angle is the maximum and the output torque of the engine, which is the substance of the invention. As understood from FIG. 7, the crank angle $\theta$ (dP/d$\theta$) max at which the output torque is the maximum is almost constant regardless of the load and the number of revolutions of the engine. In this example, the crank angle $\theta$ (dP/d$\theta$) max at which the output torque is the maximum is ATDC8°. (Hereinafter, the crank angle $\theta$ (dP/d$\theta$) max at which the output torque is the maximum is described as $\theta$ MBT).

Figure 8:
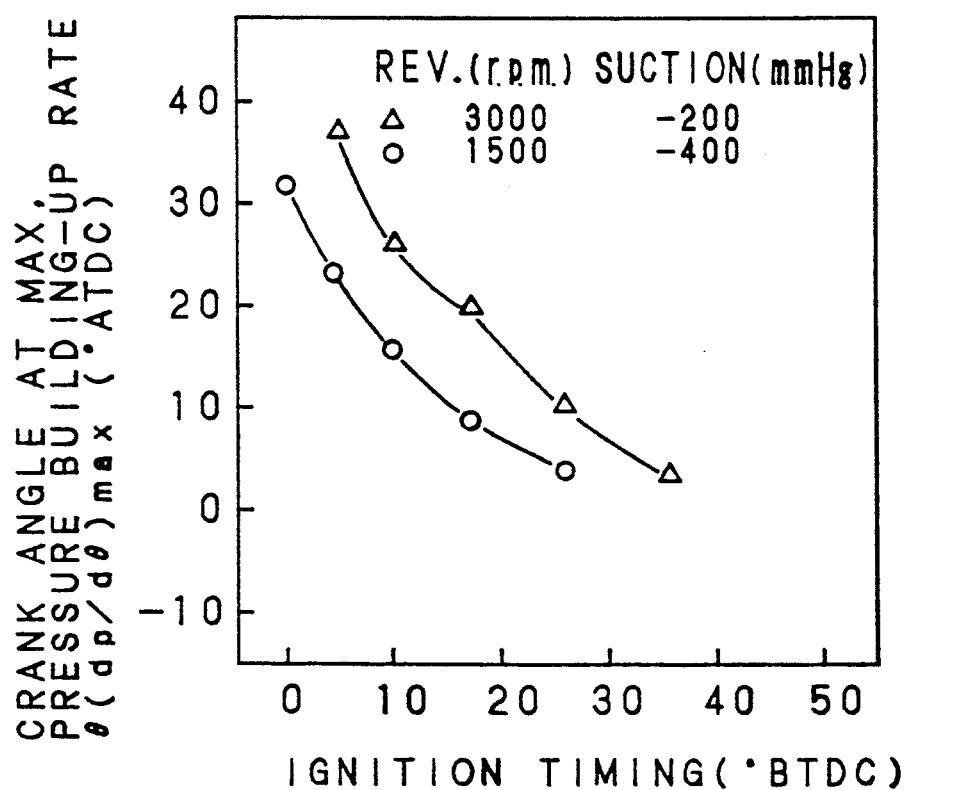
FIG. 8 is a graph showing a relation between aforesaid crank angle and the ignition timing.

FIG. 8 shows relation between the ignition timing and the crank angle $\theta$ (dP/d$\theta$) max. As understood from the drawing, since the ignition timing corresponds to the crank angle $\theta$ (dP/d$\theta$) max and the crank angle $\theta$ (dp/d$\theta$) max becomes larger as the ignition timing delays, the crank angle $\theta$ (dP/d$\theta$) max can be controlled by controlling the ignition timing.

From the above description, it is understood that the maximum torque can always be obtained if the ignition timing is controlled so that the crank angle $\theta$ (dP/d$\theta$) max is $\theta$ MBT.

Next, explanation is given on the operation.

Figure 9:
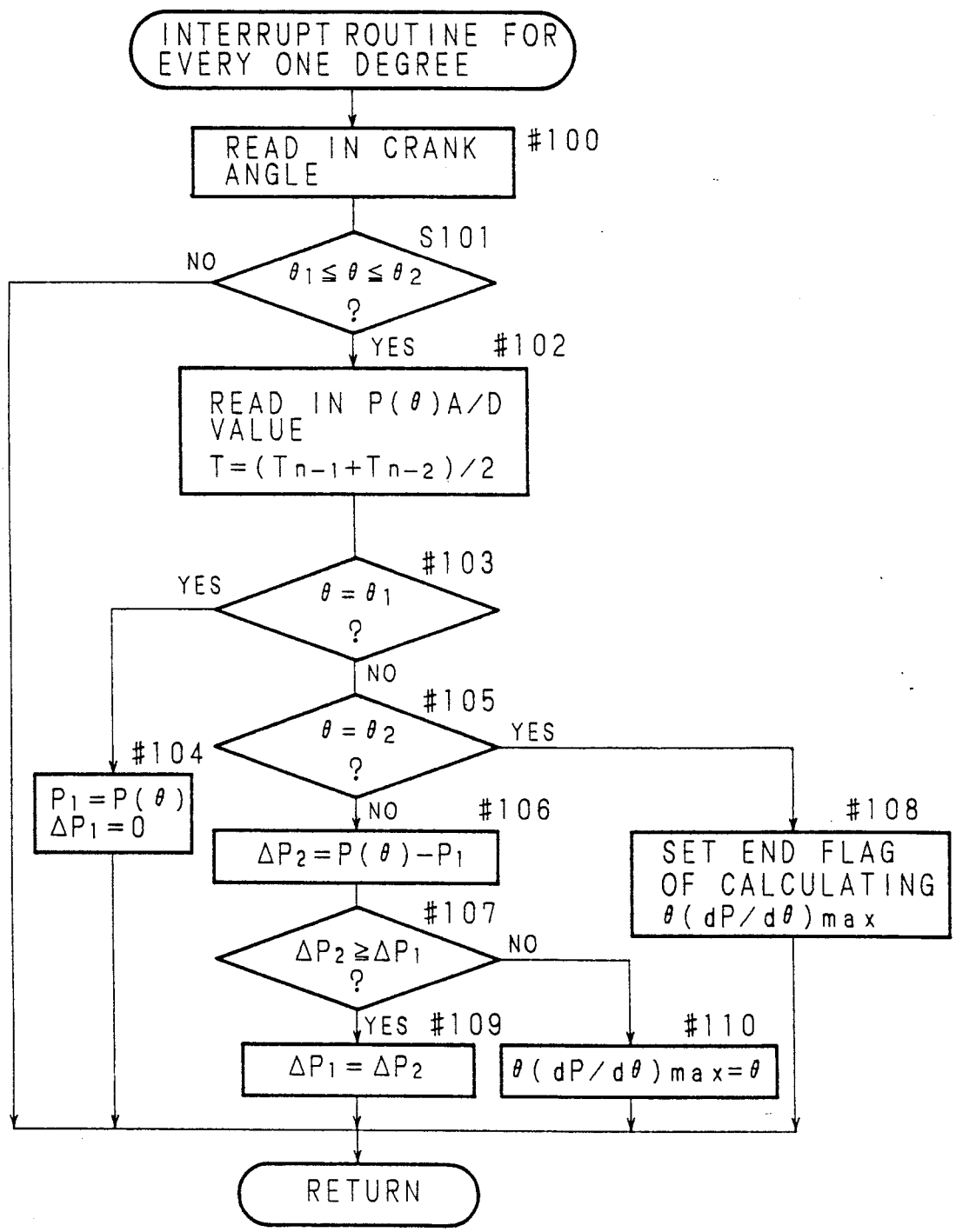
FIG. 9 is a flow chart showing an interrupt routine at every one degree of the crank angle.

At first, processing to obtain the crank angle $\theta$ (dP/d$\theta$) max is explained, referring to a flow chart in FIG. 9.

The flow chart in FIG. 9 shows an interrupt routine which is activated by a pulse at every one degree from the crank angle sensor 7. When it is activated, the crank angle $\theta$ at that time is obtained in step #100 by calculating the number of pulses outputted at every one degree after the reference pulse is inputted.

In step #101, it is judged whether or not the crank angle $\theta$ obtained in step #100 is in the range from $\theta$1 degree before combustion TDC (BTDC$\theta$1°) to $\theta$2 degree after combustion TDC (ATDC$\theta$2°) ($\theta$1 and $\theta$2 should be present in consideration of the range which the crank angle $\theta$ (dP/d$\theta$) max can take). When "Yes", after A/D value of the pressure P($\theta$) in the cylinder is read out in step #102, the processing advances to the step #103. When "No", the processing returns to main routine, and waits the next pulse outputted every one degree.

In step #103, it is judged whether or not aforesaid crank angle is $\theta$1 degree. When $\theta$1 degree, in step #104, P1=P($\theta$), $\Delta$P=0 are stored in memory by using A/D value P($\theta$) of aforesaid pressure in the cylinder, then the processing returns to the main routine. On the other hand, when the crank angle is not $\theta$1 degree, it is judged whether or not the crank angle is $\theta$2 degree in step #105. If it is not $\theta$2 degree, the processing advances to step #106, wherein $\Delta$P2=P($\theta$)-P1 is calculated and stored in the memory, then the processing advances to step #107. In addition, if it is $\theta$2 degree, an end flag of calculating crank angle $\theta$ (dP/d$\theta$) max is set (step #108), and the processing returns to the main routine.

In step #107, it is judged whether or not $\Delta$P2$\geq$$\Delta$P1. If "Yes", the content of $\Delta$P1 is renewed so as to be $\Delta$P1=$\Delta$P2 (step #109), then the processing returns to the main routine. If "No", as it is judged that the pressure building-up rate is the maximum, the crank angle $\theta$ (dP/d$\theta$) max=$\theta$ is stored in the memory (step #110), and the processing returns to the main routine.

From the processing aforementioned, the crank angle $\theta$ (dP/d$\theta$) max at which the pressure building-up rate in the cylinder at every one degree is the maximum can be obtained in the range from $\theta$1 degree before combustion TDC to $\theta$2 degree after combustion TDC.

Figure 10:
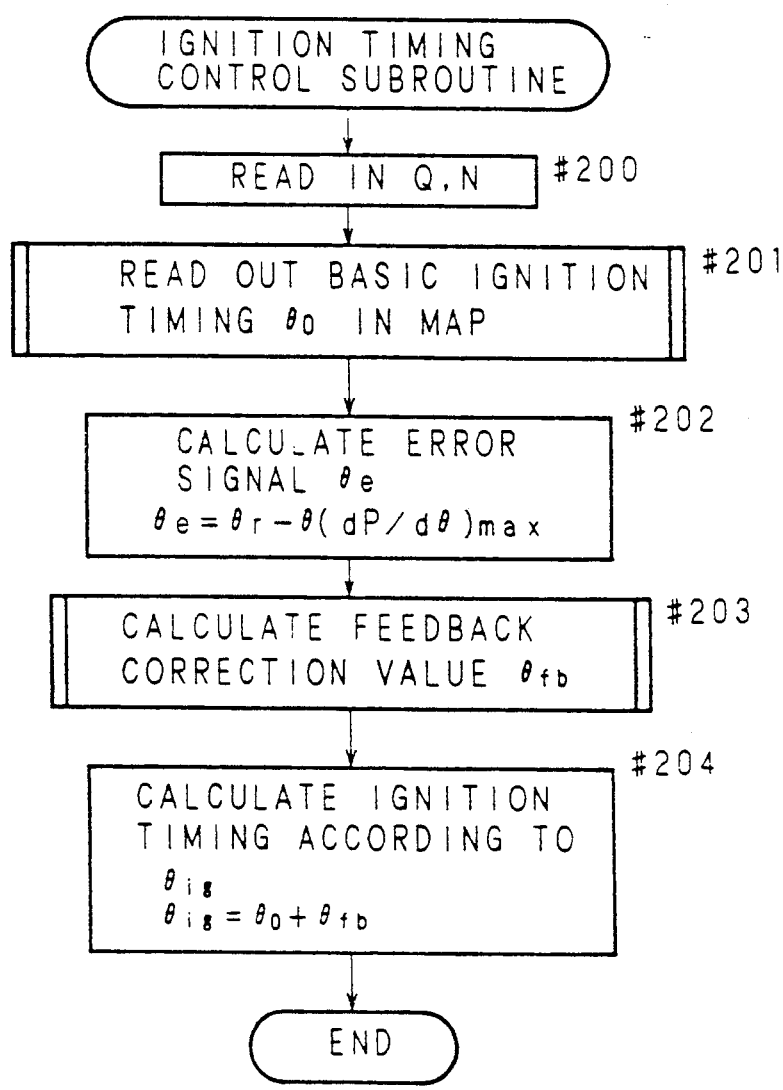
FIG. 10 is a flow chart showing an ignition timing controlling routine.

Next, the ignition timing controlling employing crank angle $\theta$ (dP/d$\theta$) max is explained, referring to a flow chart shown in FIG. 10.

The program shown in the flow chart in FIG. 10 is the program carried out at every time the end flag of calculating the crank angle $\theta$ (dP/d$\theta$) max is set after the crank angle $\theta$ (dP/d$\theta$) max is obtained in the program shown in FIG. 9. At first, in step #200, the number of revolutions N of the engine and air intake quantity Q are read in.

Next, in step #201, the pre-stored basic ignition timing map is read out corresponding to the number of revolutions N of the engine and air intake quantity Q, thereby obtaining the basic ignition timing $\theta_o$.

In step #202, an error signal $\theta_e=\theta_r-\theta$ (dP/d$\theta$) max necessary for feedback control is calculated (the target value $\theta_r$ of the crank angle $\theta$ (dP/d$\theta$) max is usually preset at the value of $\theta$MBT), then the end flag of calculating the crank angle $\theta$ (dP/d$\theta$) max is reset.

In step #203, the error signal $\theta_e$ is proportionally integrated to calculate the feedback correction value $\theta_{fb}$.

In the last step #204, the last ignition timing $\theta_{ig}$ is obtained as the sum of the basic ignition timing $\theta_o$ read out of the map and the feedback correction value $\theta_{fb}$.

And the ignition signal S6 is outputted to the ignition unit 13 in order that the ignition plug 11 is ignited at the last ignition timing $\theta_{ig}$, thereby the ignition plug 11 being driven to ignite fuel-air mixture.

Figure 11:
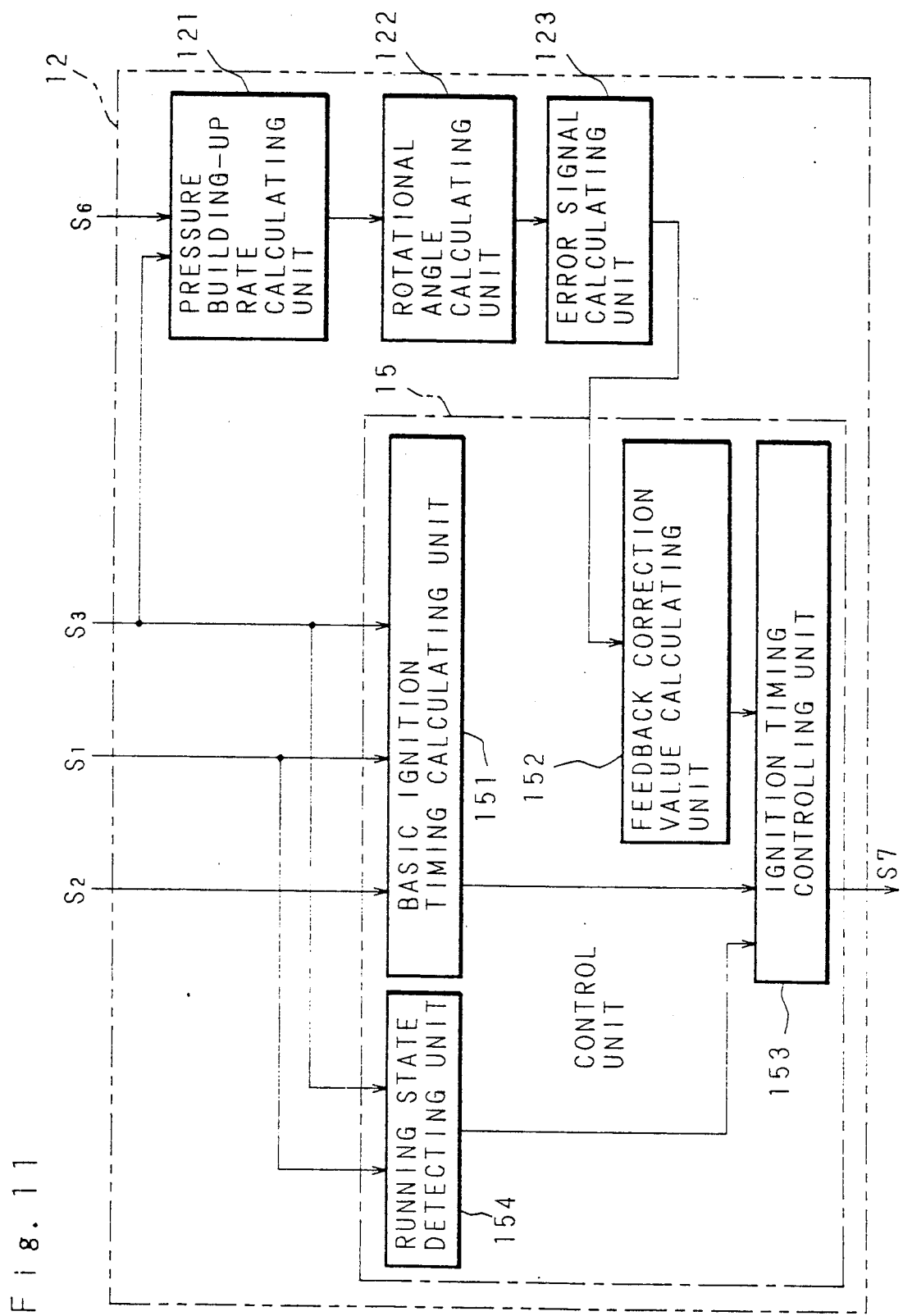
FIG. 11 is a block diagram showing a construction of an ignition control device of another embodiment.

Next, explanation is given to another embodiment of the present invention. FIG. 11 is a block diagram showing a construction of an ignition control device 12 of another embodiment. An air intake quantity signal S1, a water temperature signal S2 and crank angle signal S3 are given to a basic ignition timing calculating unit 151 which makes the signals S1 and S3 be parameters to calculate a mapped basic ignition timing $\theta_o$ and compensates it according to the water temperature signal S2. The signals S1, S3 are also given by them to a running state detecting unit 154 which detects the running state of the engine thereby. In addition, the crank angle signal S3 is also given to a pressure building-up rate calculating unit 121 together with a pressure signal S6 from a pressure sensor 14. The pressure building-up rate calculating unit 121 obtains the difference of pressure detected at every one degree of the crank angle to calculate the pressure building-up rate. The calculated result and the crank angle signal S3 at that time are given to a rotational angle calculating unit 122. The rotational angle calculating unit 122 calculates the crank angle $\theta$ (dP/d$\theta$) max at which the pressure building-up rate is the maximum. The calculated crank angle $\theta$ (dP/d$\theta$) max is given to an error signal calculating unit 123. The error signal calculating unit 123 calculates an error signal $\theta$e which is a deviation between the target value $\theta_r$ and the crank angle $\theta$ (dP/d$\theta$) max. The calculated error signal $\theta_e$ is given to a feedback correction value calculating unit 152. The feedback correction value calculating unit 152 calculates, corresponding to the error signal $\theta_e$, feedback correction value $\theta_{fb}$ which makes the deviation be zero. The calculated feedback correction value $\theta_{fb}$ is given to an ignition timing controlling unit 153 together with the basic ignition timing $\theta_o$ obtained at the basic ignition timing calculating unit 151 and the running state signal from the running state detecting unit 154, thereby the last ignition timing $\theta_{ig}$ being calculated corresponding to the running state. After that, an ignition signal S7 is outputted to the ignition unit 13 so that the ignition plug 11 is ignited at the timing $\theta_{ig}$. The control unit 15 is comprised of the abovementioned basic ignition timing calculating unit 151, feedback correction value calculating unit 152, ignition timing controlling unit 153 and running state detecting unit 154.

Figure 12:
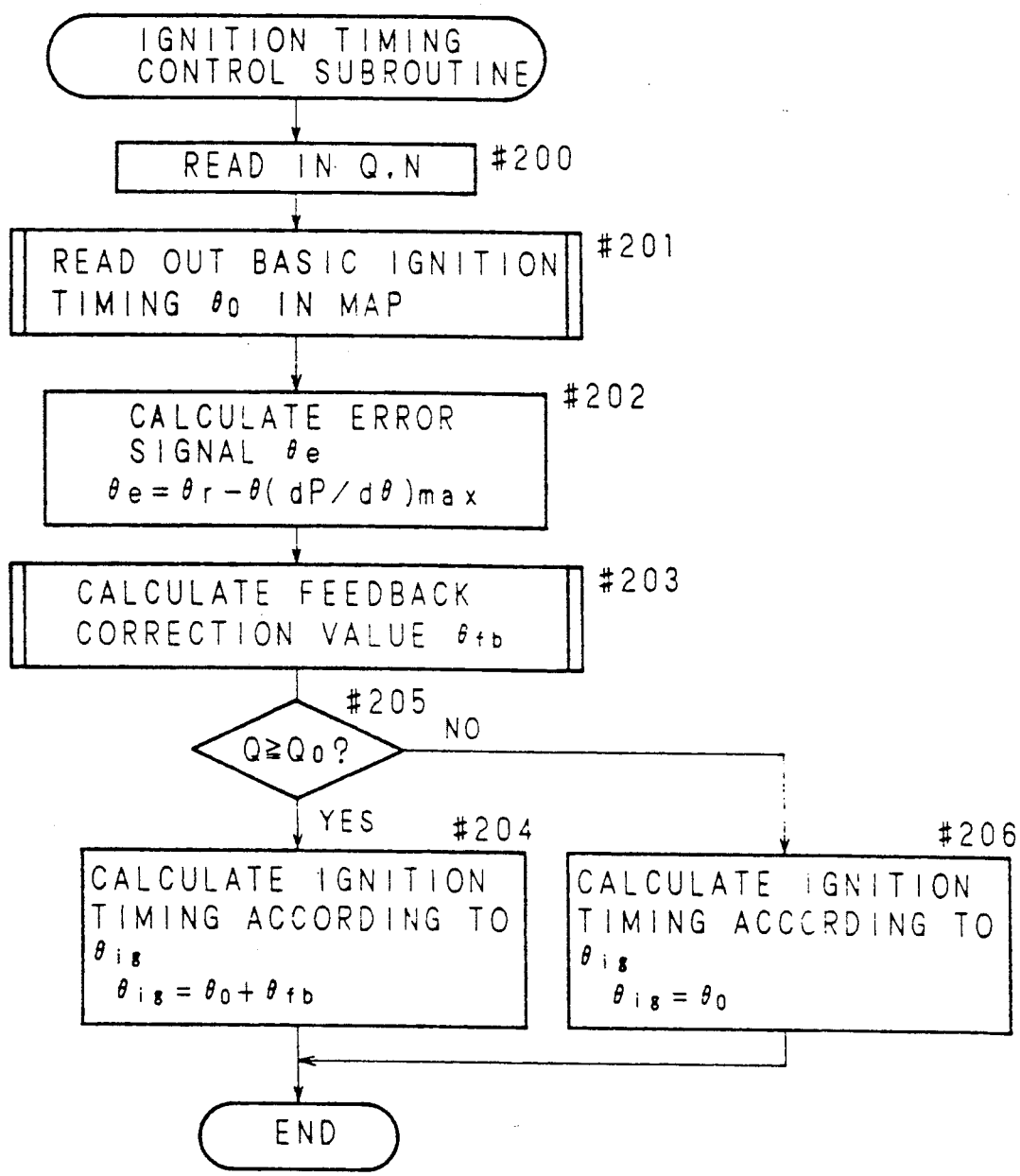
FIG. 12 is a flow chart showing an ignition timing controlling routine of another embodiment.

Next, explanation is given on the ignition timing controlling of another embodiment employing the crank angle $\theta$ (dP/d$\theta$) max, referring to a flow chart in FIG. 12.

The program shown in the flow chart in FIG. 12 is the program carried out at every time the end flag of calculating the crank angle $\theta$ (dP/d$\theta$) max is set after the crank angle $\theta$ (dP/d$\theta$) max is obtained in the program shown in FIG. 9. At first, in step #200, the number of revolutions N of the engine and air intake quantity Q are read in.

Next, in step #201, the pre-stored basic ignition timing map is read out corresponding to the number of revolutions N of the engine and air intake quantity Q, thereby the basic ignition timing $\theta_o$ being obtained.

In step #202, an error signal $\theta_e = \theta_r - \theta$ (dP/d$\theta$) max necessary for feedback control is calculated (the target value $\theta_r$ of crank angle $\theta$ (dP/d$\theta$) max is usually preset at the value of $\theta$MBT), then the end flag of calculating the crank angle $\theta$ (dP/d$\theta$) max is reset.

In step #203, the error signal $\theta_e$ is proportionally intergrated to calculate the feedback correction value $\theta_{fb}$.

In the step #204, the last ignition timing $\theta_{ig}$ is obtained as the sum of the basic ignition timing $\theta_o$ read out of the map and the feedback correction value $\theta_{fb}$.

And the ignition signal S6 is outputted to the ignition unit 13 in order that the ignition plug 11 is ignited at the last ignition timing $\theta_{ig}$, thereby the ignition plug 11 being driven to ignite fuel-air mixture.

Under the running state of the engine at the time of idling and light loading, as the maximum crank angle $\theta$ (dP/d$\theta$) max of the pressure building-up rate in the cylinder greatly varies, it is not suitable to feedback-control the ignition timing. Therefore, under the predetermined running state at the time of light loading, feedback-control according to the crank angle $\theta$ (dP/d$\theta$) max is not carried out.

Accordingly, in the flow chart of FIG. 12, it is judged whether or not the engine is in the predetermined running state (step #205) before the last ignition timing $\theta_{ig}$ is obtained (step #204). If the engine is in the running state in which the feedback-control at the time of light loading is not carried out, the last ignition timing $\theta_{ig}$ is made to be the basic ignition timing $\theta_o$ (step #206), and if the engine is in the running state except the above case, $\theta_{ig}$ is made to be the sum of the basic ignition timing $\theta_o$ and the feedback correction value $\theta$hd fb (step #204).

In addition, the predetermined running state where aforementioned feedback control is not carried out may include conditions such as the starting time when combustion of the engine is not stabilized, low temperature of water, and so on as well as the conditions of idling time and light loading.

Figure 13:
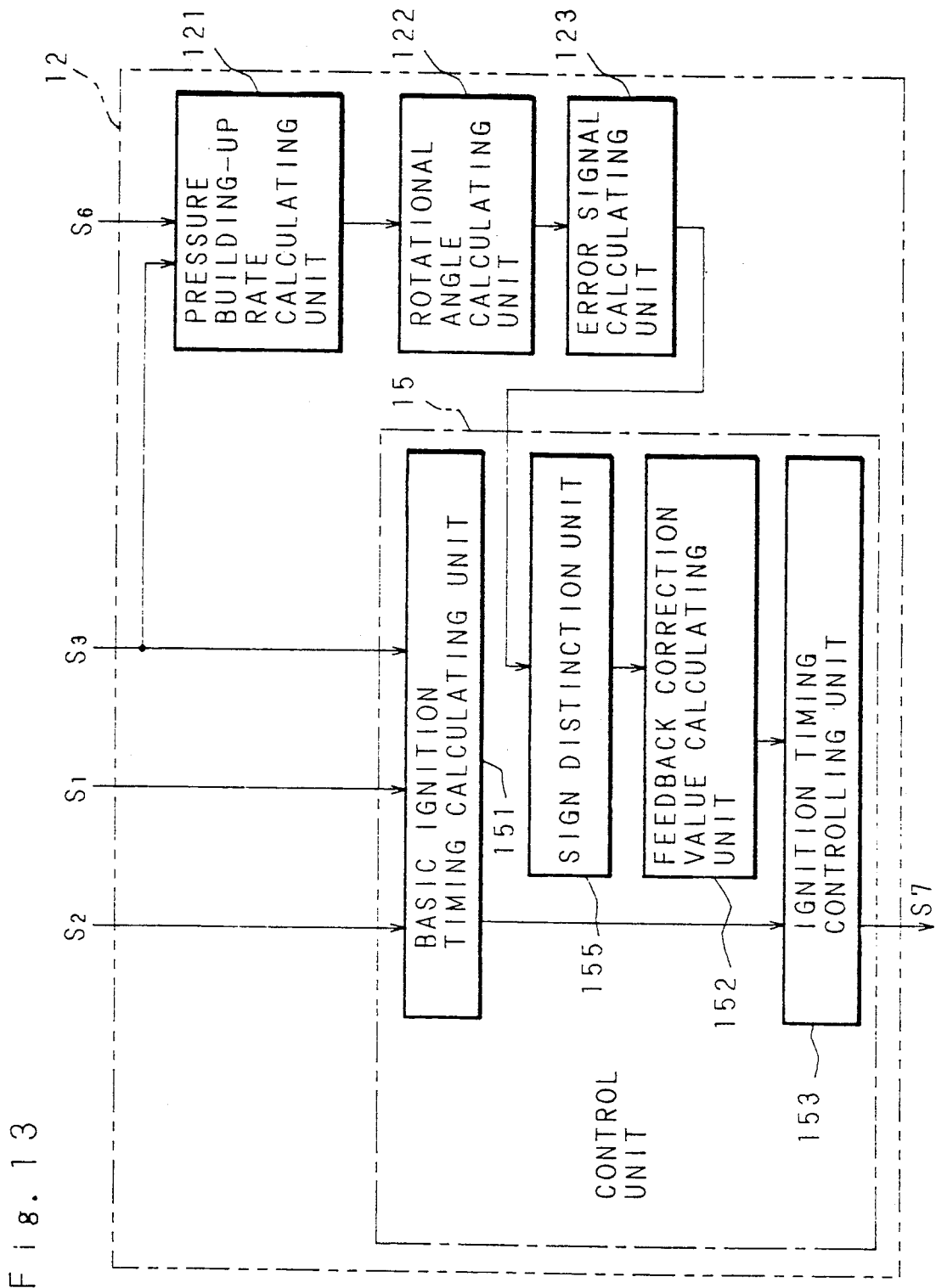
FIG. 13 is a block diagram showing a construction of an ignition control device of further embodiment.

Next, explanation is given on further embodiment of the present invention. FIG. 13 is a block diagram showning a construction of an ignition control device 12 of further embodiment of the invention. An air intake quantity signal S1, water temperature signal S2 and crank angle signal S3 which have been given to the ignition control device 12 are given to a basic ignition timing calculating unit 151 which calculates the mapped basic ignition timing $\theta_o$ by making the signals S1 and S3 be parameters, and compensates it according to the water temperature signal S2. In addition, the crank angle signal S3 is also given to a pressure building-up rate calculating unit 121 together with a pressure signal S6 from a pressure sensor 14. The pressure building-up rate calculating unit 121 obtains the difference of pressure detected at every one degree of the crank angle to calculate the pressure building-up rate. The calculated result and the crank angle signal S3 at that time are given to a rotational angle calculating unit 122. The rotational angle calculating unit 122 calculates the crank angle $\theta$ (dP/d$\theta$) max at which the pressure building-up rate is the maximum. The calculated crank angle $\theta$ (dP/d$\theta$) max is given to an error signal calculating unit 123. The error signal calculating unit 123 calculates an error signal $\theta_e$ which is a deviation between the target value $\theta_r$ and the calculated crank angle. The calculated error signal $\theta_e$ is given to a sign distinguishing unit 155 for distinguishing a sign of plus/minus thereof. The distinguished result and the error signal $\theta_e$ are given to a feedback correction value calculating unit 152. The feedback correction value calculating unit 152 calculates feedback correction value $\theta_{fb}(n)$ which makes the deviation be zero by making the gains different from each other corresponding to the distinguished result. The calculated feedback correction value $\theta_{fb}(n)$ is given to an ignition timing controlling unit 153 together with the basic ignition timing $\theta_o$ calculated by the basic ignition timing calculating unit 151 and a running state signal from the running state detecting unit 154, then the last ignition timing $\theta_{ig}$ is calculated corresponding to the running state, and an ignition signal S7 is outputted to the ignition unit 13 to ignite the ignition plug 11 at the timing $\theta_{ig}$. The control unit 15 is comprised of aforementioned basic ignition timing calculating unit 151, feedback correction value calculating unit 152, ignition timing controlling unit 153, and sign distinguishing unit 155.

Figure 14:
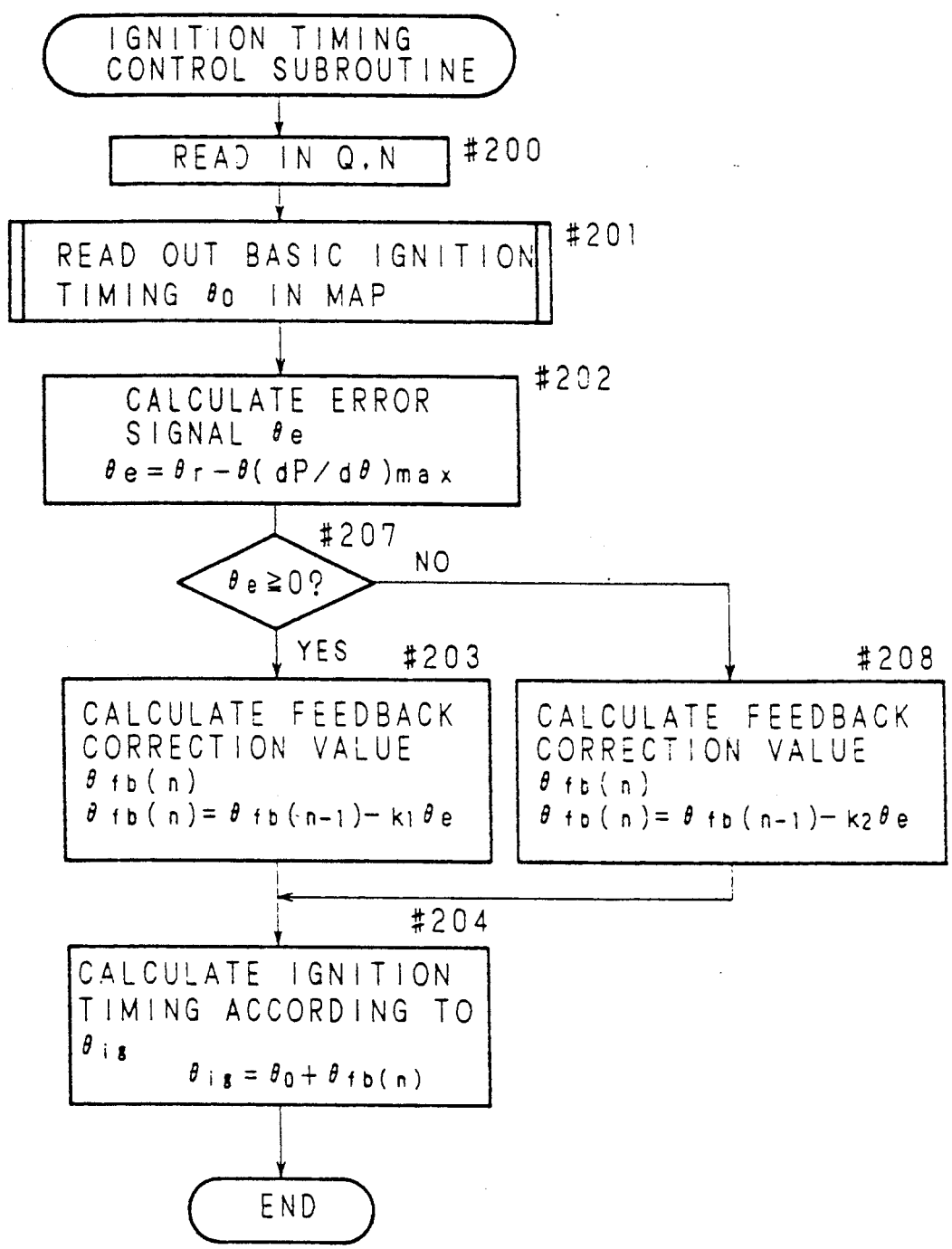
FIG. 14 is a flow chart showing ignition timing controlling routine of further embodiment.

Next, explanation is given on the ignition timing controlling of further embodiment employing the crank angle $\theta$ (dP/d$\theta$) max, referring to a flow chart in FIG. 14.

The program shown in the flow chart in FIG. 14 is the program carried out at every time the end flag of calculating the crank angle $\theta$ (dP/d$\theta$) max is set after the crank angle $\theta$ (dP/d$\theta$) max is obtained in the program shown in FIG. 9. At first, in step #200, the number of revolutions N of the engine and air intake quantity Q are read in.

Next, in step #201, the pre-stored basic ignition timing map is read out corresponding to the number of revolutions N of the engine and air intake quantity Q, thereby the basic ignition timing $\theta_o$ being obtained.

In step #202, the error signal $\theta_e = \theta_r - \theta$ (dP/d$\theta$) max necessary for feedback control is calculated (the target value $\theta_r$ of the crank angle $\theta$ (dP/d$\theta$) max is usually preset at the value of $\theta$MBT), then the end flag of calculating the crank angle $\theta$ (dP/d$\theta$) max is reset.

In step #203 (or step #208), feedback correction value $\theta_{fb}$ is calculated according to the error signal $\theta_e$. Hereupon, value of the crank angle $\theta$ (dP/d$\theta$) max to the ignition timing shown in FIG. 8 becomes larger as the ignition timing is closer to the delayed angle side. Accordingly, if the ignition timing correction value $\theta_{fb}$ is obtained by proportionally integrating the error signal $\theta_e$ intact, difference is caused in feedback controlling characteristic between the advanced angle side and delayed angle side. Thereupon, when the values of the feedback controlling gain are made to be different between the advanced angle side and delayed angle side with the target value $\theta_r$ being the referential value, the difference of aforesaid controlling characteristic is to be improved. Before calculating the feedback correction value $\theta_{fb}(n)$ in aforementioned step #203 (or step #208), in the step #207, it is judged whether the crank angle $\theta$ (dP/d$\theta$) max is in the advanced angle side ($\theta_e \geq 0$) or delayed angle side ($\theta_e < 0$) to the target value $\theta_r$, and in each case conversion coefficient (feedback gain) $k_1$ (or $k_2$: $k_1 < k_2$) from the error signal $\theta_e$ to the feedback correction value $\theta_{fb}$ is set to be different, then feedback correction value $\theta_{fb}$ being calculated by using the value of $k_1$ (or $k_2$).

In the last step #204, the last ignition timing $\theta_{ig}$ is obtained as the sum of the basic ignition timing $\theta_o$ read out of the map and the feedback correction value $\theta_{fb}$.

And the ignition signal S6 is outputted to the ignition unit 13 in order that the ignition plug 11 is ignited at the last ignition timing $\theta_{ig}$, thereby driving the ignition plug 11 being driven to ignite fuel-air mixture.

In addition, although in aforementioned three embodiments, $dP/D\theta$ being the value per unit crank angle is used as the pressure building-up rate in the cylinder, same controlling can be carried out by using $dP/dt$ being the value per unit time. Since a relation $\theta = 6Nt$ exists among the crank angle $\theta$, the number of revolutions N, and time t (in the case where $\theta$ is represented by degree, N by rpm, and t by second), $d\theta = 6Ndt$ is effected if the number of revolutions N of the engine does not change, which leads to $(dP/d\theta)$ max $= (dP/d\theta)$ max/(6N), thereby $(dP/dt)$ max can be used instead of $(dP/d\theta)$ max.

Still more, in the aforementioned embodiments, explanation has been given on how to calculate in a program the crank angle $\theta$ $(dP/d\theta)$ max at which the pressure building-up rate in the cylinder is the maximum. On the other hand, the crank angle $\theta$ $(dP/d\theta)$ max can be obtained by using peak value holding circuit or the like to a signal waveform of the pressure in the cylinder, for example.

Furthermore, in this embodiment, although the controlled target value $\theta_r$ of the crank angle $\theta$ $(dP/d\theta)$ max is set to be the value at which the maximum torque can be obtained, the target value $\theta_r$ sometimes enter a knocking region at heavy loading. As a countermeasure thereof, it is also acceptable that the target value $\theta_r$ being as a map is preset to be a value at which the maximum torque can be obtained within the region where knocking is not generated, then the target value $\theta_r$ being read out according to the number of revolutions N, the air intake quantity Q and the like.

Still more, in this embodiment, explanation has been given on the case where the absolute value of the pressure in the cylinder can be measured, and it is obvious that the aforementioned is possible with more ease in the case where the change rate of the pressure can be measured.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. An ignition timing controlling apparatus for an internal combustion engine comprising,
   rotational angle detecting means for detecting a rotational angle of said internal combustion engine,
   pressure building-up rate calculating means for calculating pressure building-up rate in a cylinder of said internal combustion engine,
   means for calculating the rotational angle at which the calculated pressure building-up rate is the maximum,
   deviation value calculating means for calculating the deviation value between the target value of the rotational angle and the rotational angle calculated by said means; and
   controlling means for controlling ignition timing in order that said deviation value is made to be zero.

2. An ignition timing controlling apparatus as set forth in claim 1, wherein said pressure building-up rate calculating means has a pressure sensor which employs piezoelectric elements for detecting pressure in the cylinder.

3. An ignition timing controlling apparatus as set forth in claim 1, wherein said controlling means is provided with means for determining basic ignition timing according to the running state of said internal combustion engine and correcting means for correcting the determined basic ignition timing with the use of the value related to said deviation value.

4. An ignition timing controlling apparatus as set forth in claim 1, wherein said target value is predetermined according to the running state of said internal combustion engine.

5. An ignition timing controlling apparatus as set forth in claim 1, wherein said controlling means is provided with means for judging the running state of said internal combustion engine, and stops said controlling for making the deviation value be zero when said means judges that said internal combustion engine is in a specific running state.

6. An ignition timing controlling apparatus as set forth in claim 1, wherein said controlling means has means for judging a sign of said deviation value, and sets gain of said controlling at different value according to positive/negative of said deviation value.

7. An ignition timing controlling apparatus as set forth in claim 3, wherein said running state is determined by load and number of revolutions of said internal combustion engine.

8. An ignition timing controlling apparatus as set forth in claim 5, wherein said running state is determined by load and number of revolutions of said internal combustion engine.

9. An ignition timing controlling apparatus as set forth in claim 7, wherein said load is determined by air intake quantity of said internal combustion engine.

10. An ignition timing controlling apparatus as set forth in claim 8, wherein said controlling means judges that the internal combustion engine is in the specific running state when the value of said load and number of revolutions is smaller than the predetermined value, stops said controlling and ignites at said basic ignition timing.

11. An ignition timing controlling apparatus as set forth in claim 6, wherein said controlling means sets the gain when said deviation value is positive at the value smaller than the gain when the deviation value is negative.

* * * * *